United States Patent
Karakoussis et al.

(10) Patent No.: US 10,946,549 B2
(45) Date of Patent: Mar. 16, 2021

(54) DEVICE FOR THE UNIFORM DISTRIBUTION OF SLURRIES

(71) Applicant: Knauf Gips KG, Iphofen (DE)

(72) Inventors: Stergios Karakoussis, Laubach (DE); Thomas Koch, Aschersleben (DE); Thomas Kramer, Kitzingen (DE); Alexander Hartmann, Kleinlangheim (DE); Georgi Paraskov, Nuremberg (DE); Rainer Schneiderbanger, Knetzgau (DE); Carlo Knauf, Weigenheim (DE)

(73) Assignee: KNAUF GIPS KG, Iphofen (DE)

( * ) Notice: Subject to any disclaimer, the term of this patent is extended or adjusted under 35 U.S.C. 154(b) by 362 days.

(21) Appl. No.: 15/565,809

(22) PCT Filed: Dec. 17, 2015

(86) PCT No.: PCT/EP2015/002543
§ 371 (c)(1),
(2) Date: Oct. 11, 2017

(87) PCT Pub. No.: WO2016/165727
PCT Pub. Date: Oct. 20, 2016

(65) Prior Publication Data
US 2018/0297233 A1   Oct. 18, 2018

(30) Foreign Application Priority Data
Apr. 14, 2015   (DE) .................. 10 2015 004 566

(51) Int. Cl.
*B28B 5/00* (2006.01)
*B28B 5/02* (2006.01)
*B28B 19/00* (2006.01)

(52) U.S. Cl.
CPC .......... *B28B 5/027* (2013.01); *B28B 19/0092* (2013.01)

(58) Field of Classification Search
CPC ........................... B28B 5/027; B28B 19/0092
(Continued)

(56) References Cited

U.S. PATENT DOCUMENTS 4,298,413 A   3/1981   Teare
4,434,119 A   2/1984   Teare
(Continued)

FOREIGN PATENT DOCUMENTS

DE   3330240 A1   3/1985
EA   200400002 A1   6/2004
(Continued)

OTHER PUBLICATIONS

First Chinese Office Action dated Mar. 15, 2019, Application No. 201580078576.2.
(Continued)

*Primary Examiner* — Michael N Orlando
*Assistant Examiner* — Elizabeth Bradford
(74) *Attorney, Agent, or Firm* — The Dobrusin Law Firm, P.C.

(57) ABSTRACT

The invention relates to a conveyor line (1) for the continuous production of drywall boards as well as a slurry distributing device (22) which is used in this conveyor line (1). The distributing device is used for the uniform and low-speed flow distribution of slurries (20).

14 Claims, 6 Drawing Sheets

Figure 1:
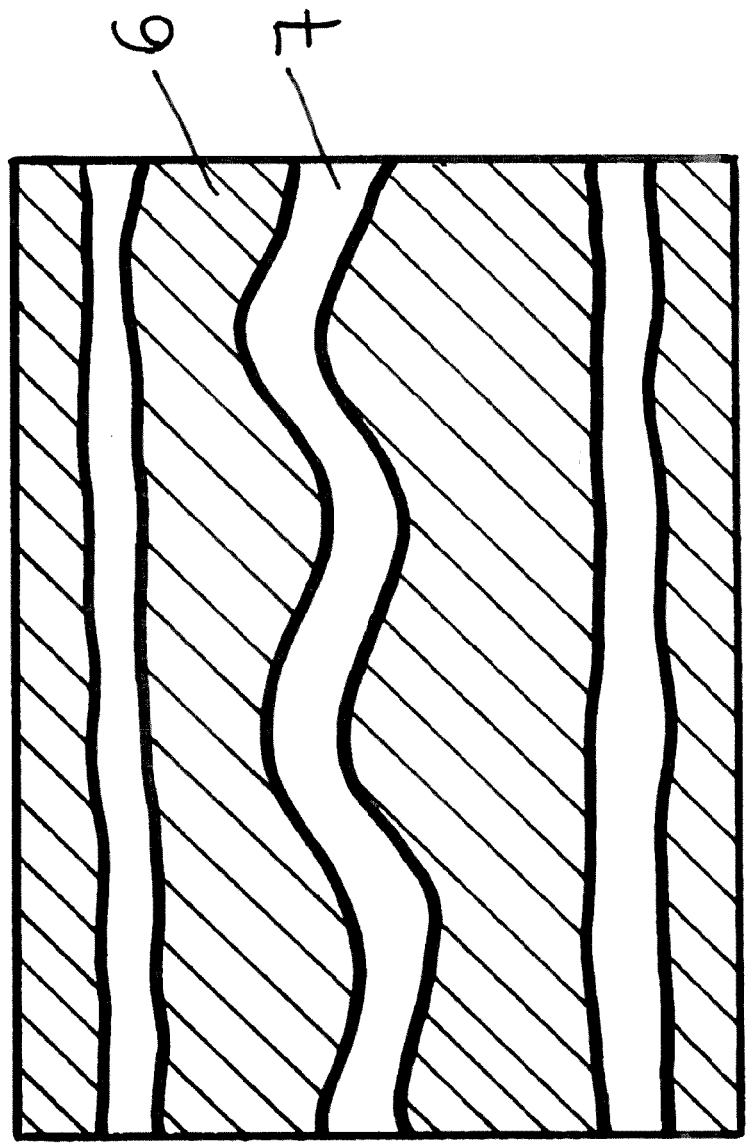

(58) Field of Classification Search
USPC .......................................................... 156/39
See application file for complete search history.

(56) References Cited

U.S. PATENT DOCUMENTS

| | | | |
|---|---|---|---|
| 6,024,554 A * | 2/2000 | Lawrence | ............... A21C 3/02 |
| | | | 425/310 |
| 6,686,492 B2 | 2/2004 | Nguyen | |
| 7,754,052 B2 * | 7/2010 | Frank | ..................... B28B 5/027 |
| | | | 156/346 |
| 10,245,611 B2 | 4/2019 | Li et al. | |
| 2005/0061237 A1 | 3/2005 | Dubey et al. | |
| 2008/0099171 A1 | 5/2008 | Frank et al. | |
| 2009/0161477 A1 * | 6/2009 | Meier | ................... A21C 7/005 |
| | | | 366/76.7 |

FOREIGN PATENT DOCUMENTS

| | | |
|---|---|---|
| JP | S58-055206 A | 4/1983 |
| JP | 2010-508178 T | 3/2010 |
| JP | 2014-511115 T | 5/2014 |
| RU | 2206487 C2 | 6/2003 |
| WO | 2005/032783 A1 | 4/2005 |
| WO | 2014/066207 A1 | 5/2014 |

OTHER PUBLICATIONS

Chile Office Action dated Dec. 12, 2018.
Columbia Office Action dated Aug. 16, 2018.
Russian Office Action dated Aug. 19, 2019, Application No. RU2017134881/03.
Japanese Office Action dated Sep. 6, 2019, Application No. JP2017-548430.
Indonesia Substantive Examination Report dated Oct. 3, 2019, Application No. IN P00201707984.
Chile Office Action dated Jun. 18, 2018.

* cited by examiner

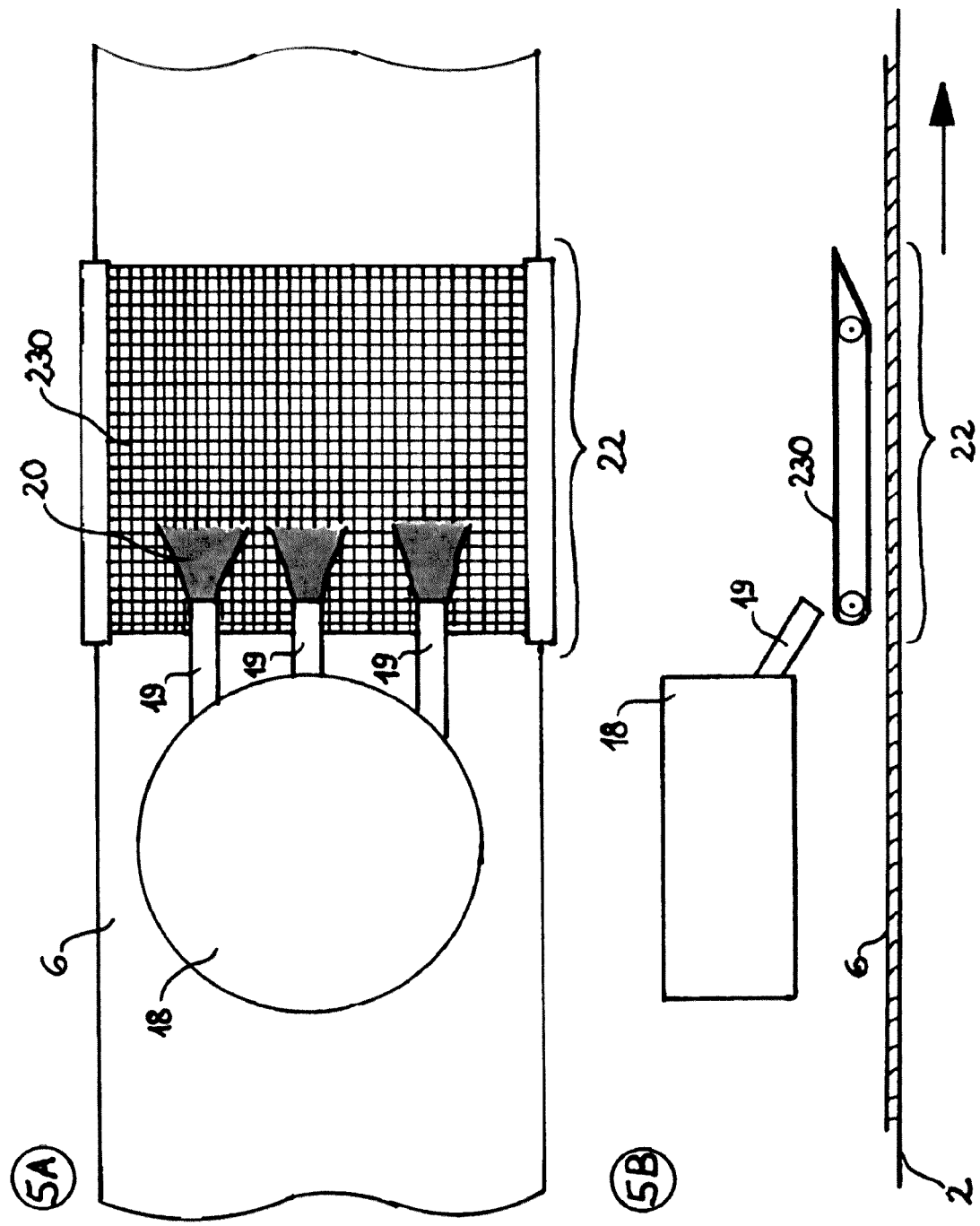

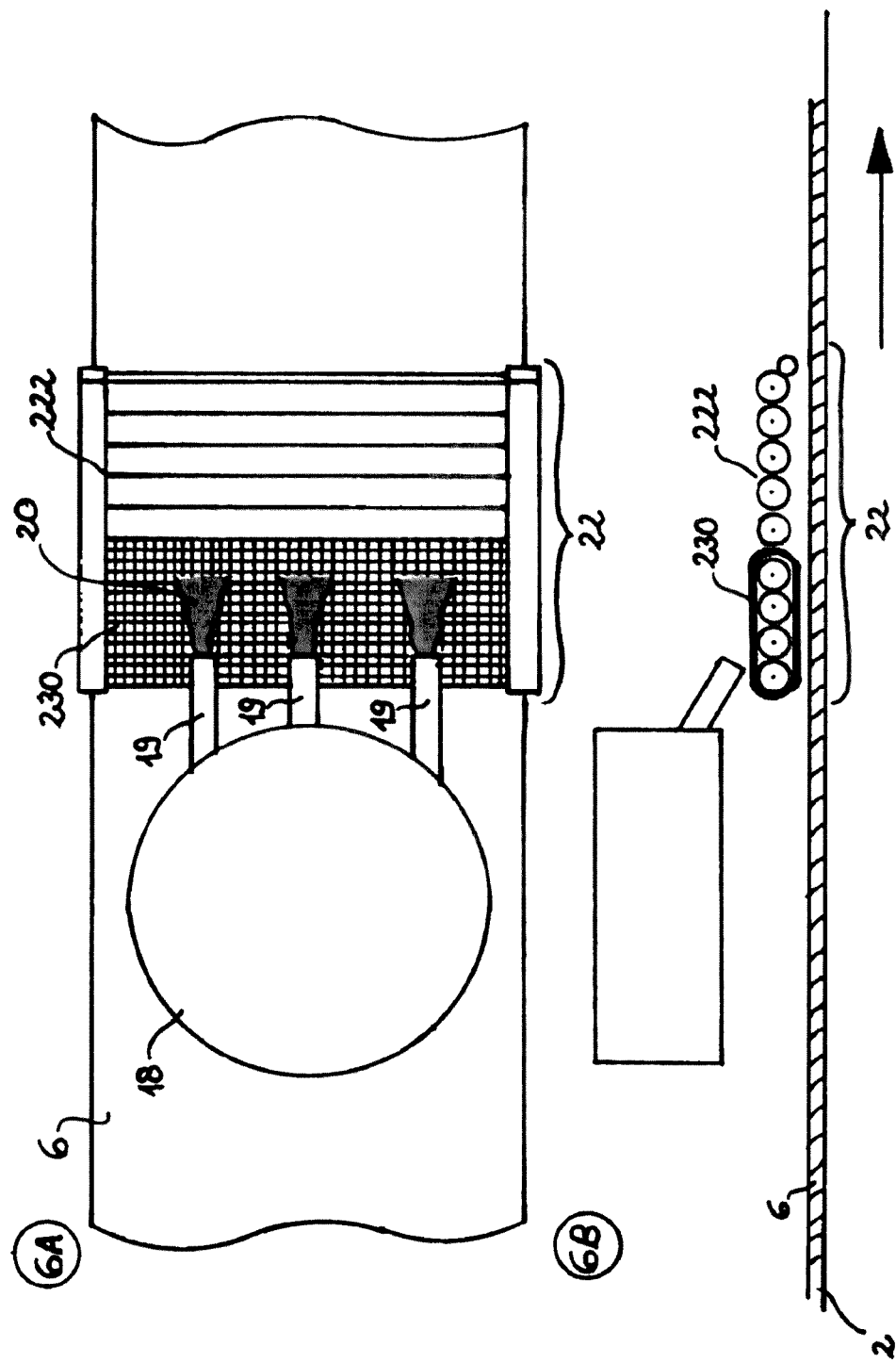

US 10,946,549 B2

1

DEVICE FOR THE UNIFORM DISTRIBUTION OF SLURRIES

The invention relates to a device for the production of drywall boards. In particular, the invention relates to a distributing device for the uniform distribution of suspensions or slurries.

Drywall boards, for example based on gypsum, are typically produced by continuous production processes. A slurry comprising the solid and the liquid components, essentially calcined gypsum, water and additives, is first produced in a mixer. The slurry is optionally foamed mechanically or chemically. The slurry is then deposited on the casing material or directly on a belt. Cardboard or nonwoven fabric are typically used as casing materials.

If a multilayer drywall board is to be produced, a plurality of layers of identical or different slurries are deposited upon one another. Located in the middle of the board is the so-called core layer, which typically makes up 50 to 90 wt.-% of the total mass of the plasterboard. When a plurality of mixers is used, the core layer is fed from the main mixer. During the setting of the material, a forming station is usually passed through, said forming station ensuring that a clean edge formation takes place. The endless strip thus produced is then cut into pieces. The excess (hyperstoichiometric) water, which has not reacted with the calcined gypsum, is expelled in a drying station.

If the drywall board has a multilayer structure, a plurality of layers of slurry have to be deposited upon one another in production. For this purpose, the slurry is often deposited on a lower layer by means of one or more hoses. When the slurry strikes the lower layer, it has a speed dependent on the cross-section of the delivery hose and on the delivery pressure. In order to achieve a good bond between the individual plies or layers, the next layer is deposited before the preceding layer has fully set or hardened. However, this has the drawback that the preceding layer is not yet stable at the time of deposition of the next layer. It can easily be damaged, i.e. so-called flushing effects can occur in the region of the deposition of the slurry. Initially uniformly deposited material of the layer lying beneath is flushed away or displaced in the region of the subsequently fed material and accumulates at other points of the board, in particular in its edge regions. The formation of layers is therefore non-uniform. The flushing effect may be more or less pronounced depending on the delivery pressure, the cross-section of the delivery hoses, the positioning of the discharge hoses and the impact angle of the slurry on the layer lying beneath.

These flushing effects occur especially in the case of thin layers that are deposited directly on the casing material. Such layers are referred to as boundary layers. Since these layers often have special functions, for example a fire protection function or increased water resistance, weak points in these functions arise in the areas in which the material has been washed away. The quality of the end products is thus markedly reduced.

FIG. 1 shows a plan view of a gypsum plasterboard, there having been deposited on a coloured boundary layer 6 (represented shaded) a next layer of gypsum 7 by means of three hoses directly onto the boundary layer, the middle one of said hoses oscillating. The cardboard has been removed after completion of the gypsum plasterboard in order to allow the boundary layer to be seen. Straight-running regions 7 can be seen at the two longitudinal edges of the gypsum plasterboard and a meandering region 7 can be seen in the middle of the board. These regions 7 correspond to

2 regions in which boundary layer 6 has been displaced by the flushing effect. Gypsum layer 6 lying beneath the latter is in direct contact with the cardboard (removed here). Regions 7 thus trace the regions in which the delivery hoses have delivered the gypsum slurry of the second layer onto the lower layer and washed away boundary layer 6.

Various distributor devices are known from the prior art that are intended to counteract the occurrence of these flushing effects and to promote a more uniform layer deposition. In principle, it is the aim of all methods to reduce the discharge pressure in the delivery hoses, especially of the main mixer. This can be achieved by reducing the flow rates in the discharge hoses, in that the hose diameter or the number of discharge hoses is increased. The core material is typically discharged from the main mixer with three up to a maximum of four hoses. However, the individual hose diameters cannot be increased arbitrarily, because otherwise the self-cleaning of the hoses is not guaranteed. If the flow rate in the hoses is reduced excessively, the hoses become blocked with hardened gypsum, which leads to a production stoppage.

The number of discharge hoses likewise cannot be increased arbitrarily. It is limited by the geometry of the mixer.

Both measures, the enlargement of the hose diameter and the increase in the number of discharge hoses, lead to an improvement in the flushing effect, but they do not remove it sufficiently. Moreover, they lead to increased maintenance outlay for cleaning work.

A further individual measure for improving the situation consists in depositing the gypsum discharges from the main mixer not in a pointwise manner via individual hoses, but rather distributed over the width of the board. For this purpose, the exit opening of the delivery hoses is modified from being round to cone-shaped or beam-shaped. A slurry distributor is known for example from WO 2012/092582 A1, which comprises two material supply lines, which emerge into a common outlet chamber and deliver the foamed material via a flat, rectangular opening onto a running belt. Since the outlet chamber has a larger cross-section than in the supply lines from the mixer to this outlet chamber, the speed of the slurry diminishes markedly in this region. The slurry can thus be deposited onto the belt or the casing material at a low relative speed, preferably the same speed as that at which the belt or the casing material is moving. The slurry can thus be deposited at a slow flow rate.

This device has the drawback, however, that directional changes with corresponding dead zones exist in the device, which can lead to setting of the material in these regions and therefore to blockages between the mixer and the outlet. These devices cannot be operated continuously without cleaning. In addition, all the discharge hoses of the main mixer that are present have to be provided with corresponding outlets and the device has to be operated with a very runny slurry. Runny slurry, however, is generally not desirable, since the water that is not required for the binding with the calcined gypsum has to be removed again by drying from the finished board. This is energy-intensive and therefore costly.

The problem underlying the invention, therefore, is to make available a slurry distributing device for distributing slurry from a mixing device, said slurry distributing device on the one hand ensuring a slurry deposition of uniform strength normal to the delivery direction and on the other hand reducing as far as possible the flushing away of layers already present, in particular slurry layers. A further problem of the invention consists in making a slurry distributing device available that needs to undergo less maintenance than the devices known from the prior art and which is easy to clean. The slurry distributing device will also be referred to simply as "distributing device" in the following.

This problem is solved by a slurry distributing device with the features of claim 1 and by a conveyor line according to claim 12. The features of the advantageous developments of the invention are set down in the respective sub-claims.

Accordingly, a slurry distributing device according to the invention is equipped to be supplied with a slurry from at least one mixing device, to adapt the speed of the slurry to a conveyor belt speed, to distribute it uniformly over a desired width and to deliver the distributed slurry onto a lower layer. The slurry distributing device transports the slurry actively. Hose outlets of any kind are not involved in the active transport of the slurry, but merely provide a line for the slurry which can modify the speed of the slurry. They do not however have any active influence on this speed.

The slurry distributing device is equipped to be supplied with a slurry from at least one mixing device. The slurry supply can take place for example with one or more hoses, which create a connection between the mixing device and the distributing device. The slurry can for example be delivered from above onto the distributing device. In the case of a hose supply, therefore, the slurry can for example run out of the hose or hoses onto the distributing device. Three or four discharge hoses are preferably used, the diameter whereof is adapted in the optimum manner for a self-cleaning effect. Since the discharge of the slurry first takes place onto the distributing device, the discharge rate is not a critical magnitude. There is therefore greater freedom in selecting the diameter of the hoses than in the case of the known systems.

Within the scope of this invention, the distributing device for the slurry denotes a device which transports the slurry actively in the delivery direction. It may for example involve a roller conveyor or a belt device or a combination of the two. The active transport of the slurry through the distributing device is to be distinguished from an outflow of the slurry from a supply line or an associated exit opening directly onto the lower layer or the last deposited layer of the gypsum strip to be produced. The distributing device is an additional device, which is disposed between the slurry supply line from the mixer and the application onto the gypsum strip to be produced.

Once the slurry flowing out in a turbulent manner has settled down, been adapted to a conveying device speed and distributed uniformly over a desired width, the slurry is delivered onto the lower layer. The lower layer can for example be a conveying device such as a conveyor belt. The lower layer can however also be a casing material such as the gypsum plasterboard cardboard (cardboard web) or a nonwoven fabric or suchlike. Moreover, the lower layer can be a casing material onto which one or more layers of gypsum have already been applied. For the sake of simplification, the delivery of the slurry onto the lower layer will be referred to in the following.

In a preferred embodiment of the invention, the slurry distributing device comprises at least two, preferably a plurality of rollers disposed in parallel with one another, which are located in a common plane and are rotatably mounted about their longitudinal axes. The parallel axes of the rollers are disposed essentially perpendicular to the delivery direction of the slurry. An essentially perpendicular arrangement is understood to mean an arrangement which enables conveying of the slurry by rotating the rollers onto the lower layer. A preferred embodiment of the invention thus makes provision such that the rollers rotate in the delivery direction. It may however also be advantageous for at least individual rollers to rotate in the opposite direction.

Particularly preferably, the rollers are in close physical contact with one another, so that the lateral surfaces of the cylindrical roller bodies slide past one another during rotation. The spacing between the individual rollers is preferably less than 0.02 mm, particularly preferably it covers a range from 0.01 to 0.005 mm.

The closest possible arrangement of the rollers beside one another has two advantageous effects. On the one hand, the virtually gap-free arrangement prevents slurry from running out or dripping through downwards. On the other hand, the close arrangement brings about self-cleaning of the rollers, as a result of which adhesion and depositing of the slurry on the rollers is effectively prevented or at least greatly reduced.

According to an alternative embodiment of the invention, the rollers can also be disposed spaced apart. The maximum spacing between the individual rollers is then determined by the viscosity of the slurry and the conveying rate onto the distributing device. The higher the viscosity of the slurry and/or the greater the conveying speed, the greater the spacing that can be selected, without the slurry dripping through the device.

According to a particularly preferred embodiment of the invention, the rollers have a uniform diameter. The rollers, which are identical in size and shape, can be produced more cost-efficient than individual special rollers.

If the rollers are disposed in direct contact with one another, it is essential for the durability and good tightness of the distributing device against the running-out of slurry that the rollers have, as far as possible, perfect concentric running properties. Perfect concentric running properties also lead to a lower degree of wear on the rollers, since they do not damage one another due to their uneven surfaces. Particularly preferably, the concentricity tolerance of the rollers is less than 0.01 mm, in particular less than 0.005 mm.

A preferred embodiment comprises, in addition to the previously described rollers which are used for the conveying, at least one last roller (discharge roller) in the delivery direction. The discharge roller can have a smaller diameter than the other rollers. Particularly preferably, this roller rotates against the delivery direction.

This last roller is preferably disposed beneath the plane of the other rollers. It can for example be pretensioned with a spring, so that it is pressed against the penultimate roller of the roller conveyor even when there is wear on the rollers. The pressing of the last roller against the penultimate roller of the roller conveyor on the one hand enables the drive for the last roller by power transmission through friction against the penultimate roller, so that this roller does not require its own drive. The drive for this discharge roller not lying in a plane with the other rollers of the roller conveyor would otherwise have to take place separately. Moreover, the self-cleaning of the last roller is thus also ensured.

Such an arrangement also has the advantage that the slurry runs onto the lower layer as it would over a step and the free fall height is thus reduced. The slurry thus strikes the lower layer with a markedly reduced impact, so that flushing effects can be completely avoided or at least greatly minimized. The average diameter of this roller preferably lies between 5 and 50 mm.

Particularly preferably, the last roller has a smaller diameter than the other rollers. A smaller drop height of the slurry from the surface of the rollers onto the surface of the lower layer can thus be achieved, because the roller axis can be disposed at a small distance from the surface of the lower layer.

Instead of just one single discharge roller, a plurality of discharge rollers can also be provided, which continuously reduce the discharge height of the slurry by the fact that they form for example an inclined plane.

The roller conveyor is at least approximately as wide as the gypsum plasterboard that is to be produced on the conveyor line. The roller conveyor is advantageously wider than the gypsum plasterboard to be produced. A roller conveyor for gypsum plasterboards with a width of 1200 to 1250 mm can thus advantageously be 1200 to 1500 mm wide. If the boards to be produced are narrower, for example 450 to 900 mm, optionally present lateral shielding plates can be suitably adjusted, i.e. displaced towards the middle (parallel to the conveying direction).

The length of the roller conveyor in the conveying direction is dependent, amongst other things, on the belt speed of the production plant. In the case of belt speeds of up to 50 m/min., the length of a typical roller conveyor preferably amounts to at least 900 mm. For production plants which have higher belt speeds, the roller conveyor usually has to be dimensioned longer. The length of the roller conveyor preferably lies between 750 and 1500 mm. In principle, the distributing device should have a length that makes it possible for the slurry flowing out in a turbulent manner to settle and to be distributed over the desired width.

The rollers can be driven and controlled by at least one controllable drive. For example, the rotational speed and therefore the quantity of slurry delivered onto the lower layer per unit of time can thus be controlled. The use of more than one controllable drive has the advantage that different roller groups can be controlled independently of one another. Thus, for example, every other roller can be rotated against the drive direction or the roller group at the end of the roller conveyor can rotate more rapidly than the roller group at the beginning of the roller conveyor.

Cylindrical backflows arise in the gussets between the rollers, said backflows leading to a transverse distribution of the slurry on the distributing device. This has the advantage that the relatively narrow outlet region of the slurry supply, for example by means of one or more hoses, is widened by the backflow and the associated transverse distribution. At the same time, there is also a reduction in the speed at which the slurry moves in the delivery direction. The more rollers are arranged one behind the other, the more pronounced the two effects are.

These effects are used within the scope of the present invention. The reduced speed and the uniform distribution of the slurry over the width of the slurry distributing device enables a uniform slurry supply over the entire width of the lower layer without special technical refinements, said slurry supply being robust and producing excellent results in terms of flushing effects scarcely occurring or not occurring at all. A complicated outlet funnel technology, as described in the prior art, is not necessary. The distributing device can be operated open, so that it is easily accessible for maintenance work. The self-cleaning effect minimizes the frequency and duration of maintenance work.

The slurry distributing device preferably comprises at least three rollers in a common plane. It has been shown that the use of 10 to 20 rollers is advantageous for achieving a uniform transverse distribution of the slurry on the distributing device. Depending on the viscosity of the slurry and the speed of the gypsum strip on the conveying device, it may be advantageous to use a greater or lesser number of rollers. Particularly preferably, 14 to 18 rollers are used, since slurries with the usual viscosity are well distributed with this number.

Rollers with a diameter of 10 to 100 mm have proved successful in tests. Roller diameters in the range between 30 and 80 mm are preferred.

The distributing device can also be constituted partially or completely by a process belt. Particularly preferably, a roller conveyor can be combined with a process belt in the distributing device.

The use of a process belt in the distributing device has the advantage that the ends of the hoses with which the distributing device is supplied with slurry from the mixing plant can be placed on the running belt. In contrast with the roller conveyor, the slurry does not strike the first rollers of the roller conveyor, but rather runs onto the process belt. The spray from slurry when it is deposited on the distributing device can thus be greatly reduced. Moreover, the outflowing gypsum slurry is already relatively markedly retarded when striking the belt.

The conveyor belt can be provided for example with a coating material such as thermoplastic polyurethane or silicone. This reduces the adhesion of set gypsum and reduces the susceptibility of the process belt to maintenance.

In addition to or as an alternative to the coating of the process belt, an only small gap can be provided at its deflection point, preferably less than 0.01 mm, with respect to an adjacent roller of a roller conveyor. This small spacing makes it possible for the gypsum adhering to the process belt to be stripped from the adjacent roller of the roller conveyor. Here too, therefore, it is possible to achieve self-cleaning of the distributing device in a straightforward manner. The self-cleaning effect is largely independent of the delivery rate of the slurry.

A preferred embodiment of the invention thus provides for a combination of process belt and roller conveyor, wherein the process belt is preferably disposed upstream of the roller conveyor.

The conveyor belt and the roller conveyor can advantageously be driven by separately controllable drive units in order to enable independent control of the two units.

The size of a combined distributing device comprising a process belt and a roller conveyor can be dimensioned as for the roller conveyor described above.

If the distributing device comprises only a process belt (without a downstream roller conveyor in the distributing device), the delivery of the slurry onto the lower layer can take place with the aid of a stripper or a process belt end in the form of a knife edge.

Slurry distributing devices according to the invention, as described above, can be used advantageously for the production of gypsum plasterboards in a continuous process.

The invention also relates to a conveyor line for producing gypsum plasterboards, which comprises a conveying device, at least one mixing device for mixing at least one slurry and at least one slurry distributing device. The slurry distributing device is disposed between a supply device for the slurry and the delivery of the slurry. The slurry distributing device is equipped to deliver the slurry supplied from the mixing device essentially uniformly onto a lower layer, wherein the lower layer is the conveying device itself or a casing material lying on the conveying device and preferably fed continuously. Moreover, the slurry distributing device is equipped to actively transport the slurry.

In order to keep the impact of the slurry when it strikes the lower layer as small as possible and thus to minimize the flushing-away effect, the discharge height of the slurry is less than 5 and preferably less than 4 cm. The discharge height is understood to mean the height difference between the uppermost point of the last roller and the surface of the lower layer. In this case, the lower layer can also comprise an already deposited layer, in particular a gypsum layer. In this case, the discharge height denotes the difference between the uppermost point of the last roller and the surface of the layer last deposited. In principle, the discharge height should be selected as small as possible.

According to a particularly preferred embodiment of the invention, the conveyor line for producing gypsum plasterboards comprises a plurality of slurry distributing devices, which are disposed one after the other in the conveyor line. The distributing devices can deliver identically or differently constituted slurries onto the lower layer, so that a multilayer structure of the gypsum plasterboard is possible. The advantage of the reduced or non-existent flushing effect is particularly beneficial precisely with this embodiment of the invention. The layers can be deposited upon one another without problem, without extensive setting of the layers lying beneath being absolutely necessary. With the claimed device, the slurry can be fed approximately at the same speed as that at which the belt is moving. The relative speed of the slurry in the delivery direction is thus approximately equal to zero (within the scope of what is technically possible).

The distributing devices can be of the same kind or different. For example, the first distributing device can comprise just a roller conveyor, whilst the other distributing devices are combinations of a process belt and a roller conveyor. Other combinations are of course also possible.

The described slurry distributing devices for producing gypsum plasterboards are advantageously used in the continuous process.

The invention is explained below in greater detail with the aid of drawings. Identical or similar features are provided with the same reference numbers.

Figure 2:
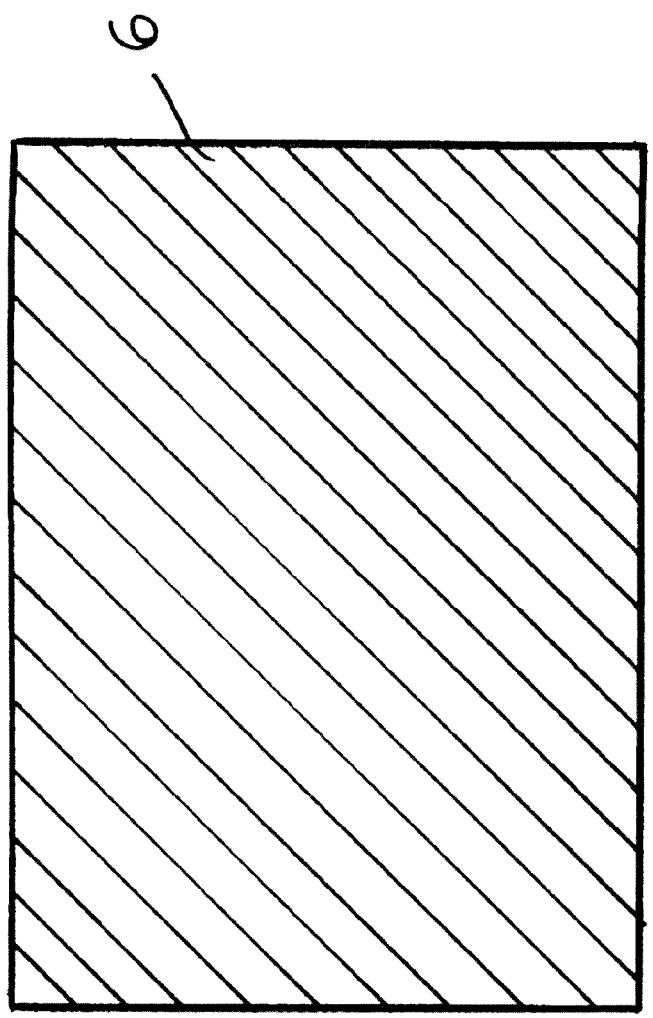
Figure 3:
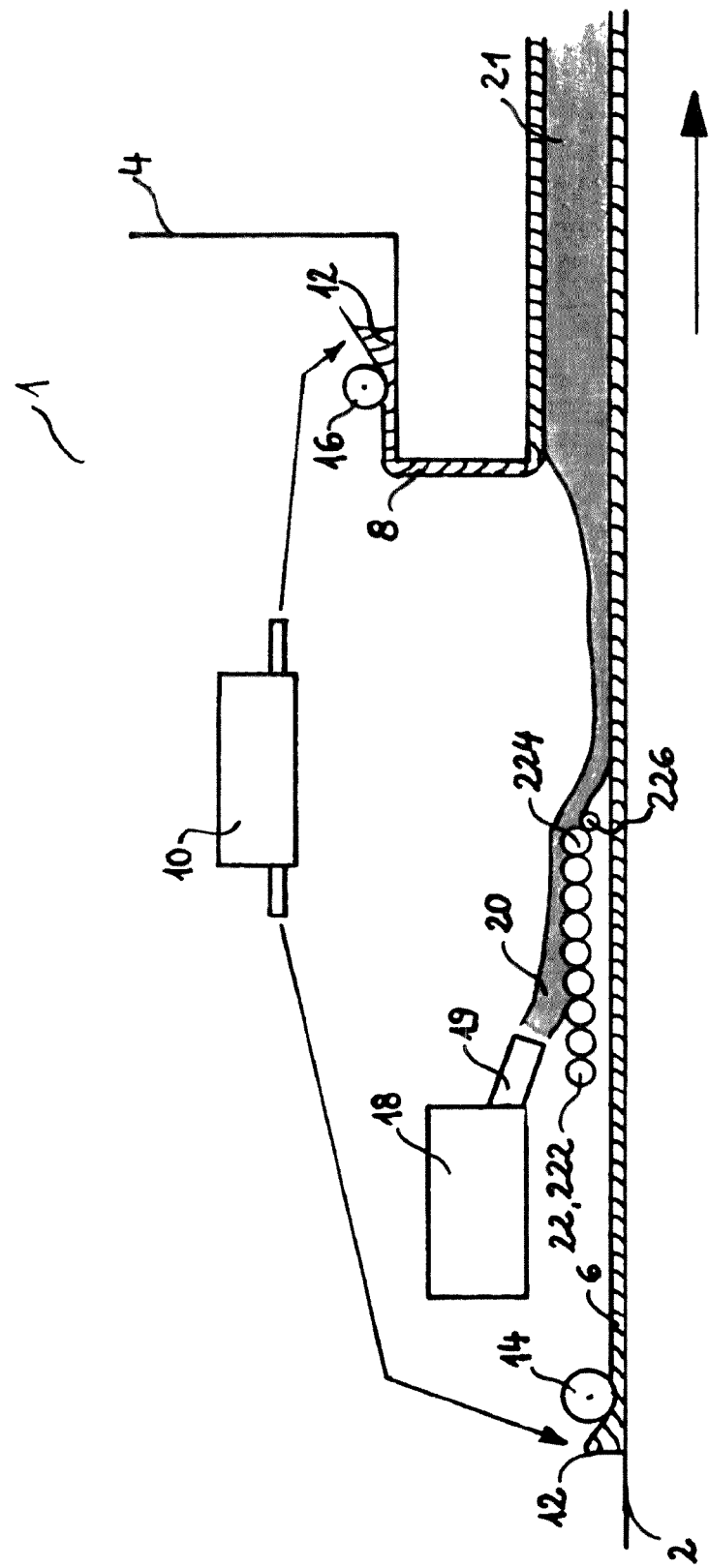
Figure 4:
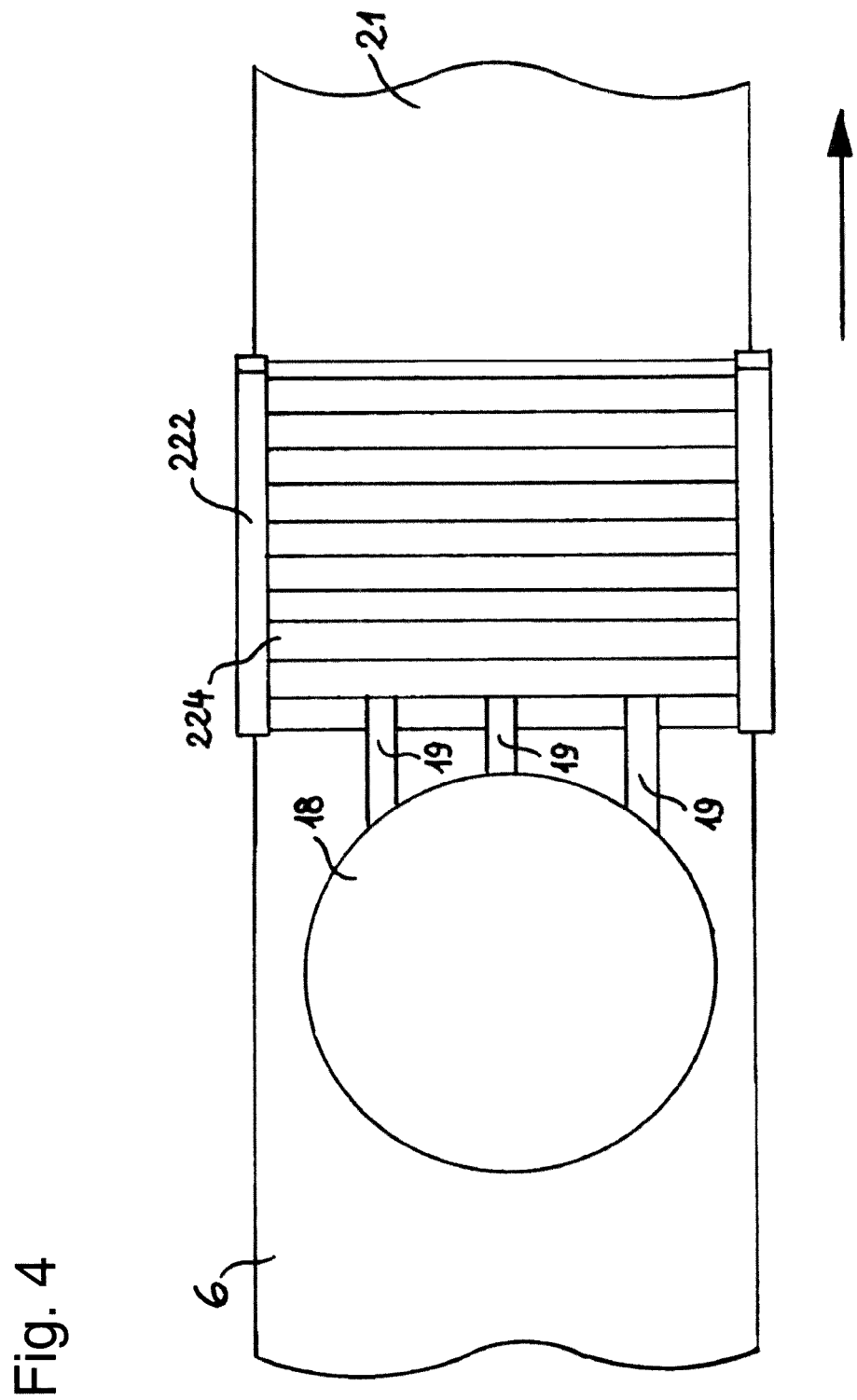

In the figures:

FIG. 1: shows a plan view of a gypsum plasterboard, from which the cardboard has been removed, produced with a device from the prior art FIG. 2: shows a plan view of a gypsum plasterboard, from which the cardboard has been removed, produced with a slurry distributing device according to the invention FIG. 3: shows a diagrammatic representation of a detail of a conveyor line FIG. 4 shows a plan view of a roller conveyor FIG. 5A: shows a plan view of a belt plant with a distributing device with a conveyor belt FIG. 5B: shows a cross-sectional view of the belt plant from FIG. 5A

FIG. 6A: shows a plan view of a distributing device, comprising a combination of a process belt and a roller conveyor FIG. 6B: shows a side view of the distributing device from FIG. 6A.

FIG. 2 shows a plan view of a gypsum plasterboard which has been produced with a slurry distributing device according to the invention. The surface cardboard has been removed, so that coloured boundary layer 6 (shaded), which was deposited directly onto the cardboard, can be seen. In contrast with the gypsum plasterboard that has been produced with a device according to the prior art (FIG. 1), no flushing effects can be seen here. The coloured boundary layer is present uniformly over the entire board surface.

FIG. 3 shows diagrammatically a detail from conveyor line 1 according to the invention. Visible-side cardboard 2, onto which the gypsum mush or the slurry is deposited, is delivered onto a conveyor belt (not shown) via a deflection roller (not shown). Visible-side cardboard 2 is first coated with a boundary layer 6. For this purpose, a slurry 12 is delivered from boundary layer mixer 10 onto visible-side cardboard 2 and distributed by means of roller 14 over the width of the cardboard and smoothed out to the desired height.

In parallel with this, rear-side cardboard 4 is coated with the aid of roller 16 with the same or a similar slurry 12 from boundary layer mixer 10.

Slurry 20 for core layer 21 of the gypsum plasterboard is produced in a core layer mixer 18 and delivered via delivery hose 19 onto a slurry distributing device 22. In the present example, slurry distributing device 22 is a roller conveyor 222. Roller conveyor 222 comprises a plurality of rollers 224 of equal size and a discharge roller 226 at the end of roller conveyor 222 with a smaller diameter. Equal-sized rollers 224 of roller conveyor 222 are disposed in a plane and in this example have a diameter of approx. 60 mm, whilst the diameter of discharge roller 226 lies at approx. 25 mm. The rollers here have an average spacing of 0.008 mm from one another. The rollers are driven by two independently controlled drive units (not shown) and can rotate in different directions.

The distributing device in the present case has a width of 1300 mm and is thus suitable for the production of gypsum plasterboards with a maximum width of 1250 mm. Narrower gypsum plasterboards can be produced by displacing edge plates (not shown), which limit the propagation width of gypsum slurry 20 on distributing device 22.

Slurry 20 deposited onto roller conveyor 222 is first retarded by the active transport on rollers 224 and is then distributed in the width by backflows occurring in the gussets between individual rollers 224. Moreover, the conveying speed of slurry 20 is adapted to the conveying speed of the visible-face cardboard, i.e. of the conveying belt plant, so that slurry 20 has essentially the same speed as the lower layer in the conveying direction (arrow) when it is delivered onto the lower layer—here the visible-side cardboard, coated with boundary layer 6.

At the end of roller conveyor 222, slurry 20 is delivered step-wise onto lower layer 6 via discharge roller 226 disposed lower down. The uppermost point of discharge roller 226 is disposed approx. 3 cm above the surface of the lower layer, here boundary layer 6, so that the drop height of slurry 20 from roller conveyor 222 onto lower layer 6 is only very small. Its impact upon striking the surface of boundary layer 6 is therefore also very small and does not trigger a flushing effect in the, in this case, boundary layer 6.

After core layer 21 of slurry 20 has been deposited or delivered onto boundary layer 6 of visible-side cardboard 2, rear-side cardboard 4 with boundary layer 8 is applied onto core layer 21. The gypsum plasterboard strip is then allowed to set and is divided up into the desired board size (not shown). Drying of the boards then takes place, which removes the excess water from the gypsum plasterboards.

FIG. 4 shows roller conveyor 222 once again in plan view.

According to an alternative embodiment (not shown), a plurality of discharge rollers 226 can also be present. For example, four discharge rollers 226 can be provided. Discharge rollers 226 can then advantageously be disposed in an inclined plane, which continuously reduces the discharge height between roller conveyor 226 and the surface of lower layer 6, so that only a very small, i.e. less than 3 cm, specific discharge height is finally created.

FIGS. 5A and 5B show in plan and in cross-section view an embodiment of the invention in which distributing device 22 is a process belt 230, more precisely a knife-edge belt. Slurry 20 of core layer 18 is delivered onto the belt via delivery hoses 19, which lie on process belt 230. Slurry 20 can be distributed actively, for example by means of a roller (not shown), over the entire width of process belt 230. If the viscosity of slurry 20 is sufficiently low, the slurry can also be distributed by simply flowing over the entire width of the belt. A vibrator can optionally be provided, which assists the flow. Process belt 230 reduces the speed of slurry 20 exiting from the delivery hoses to the speed at which the conveyor belt with visible-side cardboard 2 is running, so that there is virtually no longer any difference in speed in the conveying direction. The discharge height of slurry 20 to lower layer 6 is less than 3 cm. The discharge of slurry 20 onto the lower layer can take place by means of a stripper placed at an angle, e.g. between 40 and 50°, or via the knife edge itself.

The process belt can be cleaned free from adhering gypsum residues by means of a counter-rotating roller with a small diameter (20 to 45 mm diameter) disposed after the rear deflection roller (in the conveying direction), i.e. located beneath the knife edge (not shown).

A distributing device 22, which comprises a combination of process belt 230 and roller conveyor 222, is shown in FIGS. 6A and 6B. In this case, slurry 20 is first delivered onto a process belt 230, where it is retarded and a first preliminary distribution of the slurry in the width takes place. Following the transfer onto roller conveyor 222, the process takes place as described in the text relating to FIG. 3.

Process belt 230 is disposed in such a way that, when it circulates around the rear deflection roller (in the conveying direction), it runs directly adjacent to the first roller of roller conveyor 222. The gap between process belt 230 and the first roller of roller conveyor 222 is preferably less than 0.01 mm, so that both the belt and the first roller mutually clean one another free from adhering gypsum residues.

Process belt 230 and roller conveyor 222 can be disposed in a plane and adjoining one another seamlessly. It is however also possible to dispose process belt 230 partially overlapping above of roller conveyor 222. Process belt 230 can then advantageously form an inclined plane. Slurry 20 is transferred in this case not onto the first roller of roller conveyor 222, but is deposited generally in the front part of roller conveyor 222.

FIG. 6B shows a side view of an embodiment of the invention in which process belt 230 and roller conveyor 222 are disposed in a plane.

LIST OF REFERENCE NUMBERS 1 conveyor line according to the invention
2 visible-side cardboard
4 rear-side cardboard
6 lower boundary layer (lower layer)
7 region with visible flushing effect
8 upper boundary layer
10 boundary layer mixer
12 slurry for boundary layer
14 roller
16 roller
18 core layer mixer
19 delivery hose
20 slurry for core layer
21 core layer
22 slurry distributing device
222 roller conveyor
224 rollers of the roller conveyor
226 discharge roller of the roller conveyor
230 process belt

The invention claimed is:

1. A slurry distributing device comprising: a roller conveyer, wherein three or more rollers are disposed in parallel with one another in a common plane such that gussets between the individual rollers are formed for enabling occurrence of backflow of slurry, the three or more rollers are rotatably mounted about their longitudinal axes and are disposed essentially perpendicular to a delivery direction of the slurry, wherein the slurry distributing device is equipped to be supplied with the slurry from at least one mixing device, to adapt a speed of the slurry to a conveying device speed and to distribute the slurry uniformly over a desired width and then to deliver the distributed slurry onto a lower layer, wherein the slurry distributing device actively transports the slurry.

2. The slurry distributing device according to claim 1, wherein the three or more rollers are in direct contact with one another.

3. The slum distributing device according to claim 1, wherein the three or more rollers are equipped to rotate in the delivery direction or alternately in the delivery direction and against the delivery direction.

4. The slum distributing device according to claim 1, wherein the slurry distributing device also comprises at least one last roller in the delivery direction, which has a smaller diameter than the other rollers.

5. The slurry distributing device according to claim 4, wherein the at least one last roller is equipped to rotate against the delivery direction.

6. The slurry distributing device according to claim 4, wherein the at least one last roller is disposed beneath the common plane of the other rollers.

7. The slurry distributing device according to claim 4, wherein the at least one last roller is pretensioned by means of a spring.

8. The slurry distributing device according to claim 1, wherein the slurry distributing device comprises, in addition to the roller conveyor, a process belt.

9. The slurry distributing device according to claim 8, wherein the process belt is disposed upstream of the roller conveyor.

10. The slurry distributing device according to claim 8, wherein the process belt and the roller conveyor have separate drive units.

11. A conveyor line for producing gypsum plasterboards, comprising a conveying device, at least one mixing device for mixing at least one slurry and at least one slurry distributing device comprising a roller conveyer, wherein three or more rollers are disposed in parallel with one another in a common plane such that gussets between the individual rollers are formed for enabling occurrence of backflow of slurry, the three or more rollers are rotatably mounted about their longitudinal axes and are disposed essentially perpendicular to a delivery direction of the slurry; wherein the at least one slurry distributing device is disposed between a supply device for the slurry and delivery of the slurry, and wherein the at least one slurry distributing device is equipped to adapt a speed of the slurry to a conveying device speed and to deliver the slurry supplied from the at least one mixing device essentially uniformly onto a lower layer, wherein the lower layer is the conveying device itself or a casing material lying on the conveying device and preferably fed continuously, wherein the at least one slurry distributing device is equipped to actively transport the slurry.

12. The conveyor line according to claim 11, wherein a discharge height of the slurry from the at least one slurry distributing device onto a surface of the lower layer is less than 5 cm, preferably less than 4 cm.

13. The conveyor line according to claim 11, wherein a plurality of slurry distributing devices are disposed one after the other, by means of which identically or differently constituted slurries are delivered onto the lower layer.

14. A method for the use of the slurry distributing device according to claim 1 including producing gypsum plasterboards in a continuous process.

* * * * *

UNITED STATES PATENT AND TRADEMARK OFFICE
CERTIFICATE OF CORRECTION

PATENT NO. : 10,946,549 B2
APPLICATION NO. : 15/565809
DATED : March 16, 2021
INVENTOR(S) : Stergios Karakoussis et al.

Page 1 of 1

It is certified that error appears in the above-identified patent and that said Letters Patent is hereby corrected as shown below:

In the Claims

Column 10, Line 24, delete "slum distributing" and insert --slurry distributing--

Column 10, Line 28, delete "slum distributing" and insert --slurry distributing--

Signed and Sealed this
Eleventh Day of May, 2021

Drew Hirshfeld
*Performing the Functions and Duties of the
Under Secretary of Commerce for Intellectual Property and
Director of the United States Patent and Trademark Office*